United States Patent [19]

Lawson

[11] Patent Number: 4,470,555

[45] Date of Patent: Sep. 11, 1984

[54] METHOD AND APPARATUS FOR WINDING STRIP MATERIAL

[75] Inventor: Kenneth T. Lawson, Stokesley, England

[73] Assignee: Davy McKee (Poole) Ltd., England

[21] Appl. No.: 467,293

[22] Filed: Feb. 17, 1983

[30] Foreign Application Priority Data

Feb. 9, 1982 [GB] United Kingdom ................ 8203680

[51] Int. Cl.³ ...................... B21C 47/02; B65H 25/26; B65H 35/02
[52] U.S. Cl. .................................... 242/56.2; 226/19; 242/56.8; 242/57.1; 242/78.1
[58] Field of Search .................... 242/56.2, 56.8, 57.1, 242/78.1; 226/15, 18, 19, 20, 21, 22, 23; 83/364, 358; 26/10.4

[56] References Cited

U.S. PATENT DOCUMENTS

| | | | |
|---|---|---|---|
| 2,871,013 | 1/1959 | Markey | 226/22 X |
| 3,086,729 | 4/1963 | Mayhew | 242/78.1 |
| 3,225,988 | 12/1965 | Drenning | 226/19 |
| 4,173,313 | 11/1979 | Rogers | 242/56.8 X |
| 4,358,978 | 11/1982 | Lawson | 83/364 |

Primary Examiner—Stuart S. Levy
Assistant Examiner—Katherine Jaekel
Attorney, Agent, or Firm—Lee, Smith & Zickert

[57] ABSTRACT

A method and apparatus for winding strip material is described in which strip which has partially severed scrap edge portions still frangibly attached thereto, is wound on to a coil or mandrel so that the cut edges of the strip are aligned. The strip passes past trimming knives which partially sever the edge portion and sensors measure the lateral position T of the knife and the lateral position E of the uncut edge of the edge portion adjacent to the knife position A. The scrap width T—E is then recorded. As the strip is about to be wound on to the coil at position B the lateral position R of uncut edge of scrap portion is sensed by a sensor. The appropriate scrap width is then determined by reference to the recorded scrap width and the strip travel between points A and B which is determined from a tachometer attached to a roll over which the strip passes. The actual position of the cut edge of the strip at position B is determined and the axial position of the coil adjusted so that the cut edge of the strip on the coil is aligned.

14 Claims, 6 Drawing Figures

METHOD AND APPARATUS FOR WINDING STRIP MATERIAL

FIELD OF THE INVENTION

This invention relates to a method of winding strip material, and in particular, though not exclusively, to a method of winding strip metal into coils for shipment or for subsequent processing.

BRIEF DESCRIPTION OF THE PRIOR ART

Rolling faults cause variations in the width of the strip and produce an uneven or ragged edge on the strip. It is desirable to have strip with straight edges, particular when coiled. To produce strip of constant width and with a uniform smooth edge, the uneven edge or scrap portions of the strip are trimmed off. This may be done moving the strip past a trimming knife. Trimmed strip can be conveniently coiled on to a coil or mandrel so that a straight sided coil is produced, e.g. by aligning the tension coil or mandrel so that the edge of the strip being coiled is aligned with the edge of the strip already coiled. However, there are problems associated with the production of such strip; for example, the continously produced ragged scrap portions are difficult to handle and a dangerous situation may occur if the strip narrows so much that the trimming knife runs off the edge of the strip. Some such problems are avoided by processes of edge trimming which involve partially severing the scrap portion from the strip, so that the scrap portion remains frangibly attached to the strip and can be removed at a later stage, e.g. when the strip has been coiled. Methods of partially slitting strip so as to produce strip in which the slit strip edges are connected together at intervals are described in U.K. Patent Specification No. 1566741. Such methods suffer from the disadvantage that, if the edges of the strip and coil are aligned by the conventional method already mentioned, when the scrap portions are removed the resulting trimmed coil will be left with sides which are not straight. The present invention seeks to overcome these disadvantages of the prior art.

This invention provides a method and apparatus for winding strip material on to a coil or mandrel. The strip to be wound has at least one scrap edge portion partially severed by a trimming knife along a straight line, in such a way that the scrap portion is frangibly attached to the strip. A continuous record of the width of the scrap portion at a position A of the knife is produced and the lateral position R of the outer edge of the scrap portion as the strip is about to be wound on to the coil or mandrel at a position B is also determined. The appropriate measured width of the scrap portion at position B is determined by reference to the record of scrap portion width and the length of strip between the points A and B from this the actual position (R-scrap width) of the cut straight edge of the strip at the position B is determined and the axial position of the coil or mandrel is controlled so that the strip will be wound to produce a coil with the cut edge of the strip in alignment.

Preferably the width of the scrap portion is found by taking a continuous series of measurements of the lateral position T of the trimming knife or the straight edge of the strip, at or adjacent to a position A of the knife; taking a corresponding series of measurements of the lateral position E of the adjacent outer edge of the scrap portion, and producing a record of E-T. Alternatively the scrap width may be determined by taking a continuous series of measurements of the position of the edge of the strip relative to the trimming knife at or adjacent thereto, which relative position is effectively a measurement of the scrap width (E-T).

Both edges of the strip may be subjected to the trimming operation but it is only necessary to carry out the measurements referred to above at one edge of the strip.

Preferably the method is applied to a metal strip such as, for example, tin plate or stainless steel strip, and it may be applied either at the end of a production line where the strip is to be coiled for transporting away or in the course of production where for example a pickling or other operation is to be carried out and the strip has to be re-wound in coil form.

The length of the strip between the points A and B may be determined by for example use of a digital tachometer driven by a roll over which the strip passes at some stage. If the strip is in firm non-slipping contact with the roll an accurate digital representation of the length of the strip between the points A and B will be produced.

The measurement T may be either effected at the trimming knife edge or at the trimmed straight edge adjacent the trimming knife. Measurement E should be as close as reasonably possible to the measurement T although in practice the error involved in taking the measurement E a few centimeters away from the measurement T along the strip will not be large enough to affect the end result.

Preferably the measurements are produced on a continuous basis i.e. the data from measurements E, T and R are fed into a microcomputer and the microcomputer carries out the calculation R-(E-T) on a continuous basis and feeds the continuous series of signals to a controller or an actuator by which the coil or mandrel is moved laterally so as to align with the incoming straight edge of the strip on a continuous basis.

BRIEF DESCRIPTION OF THE DRAWINGS

Other objects and advantages of the invention will become apparent from the following description with reference to the accompanying drawings, in which.

DETAILED DESCRIPTION

Figure 1:
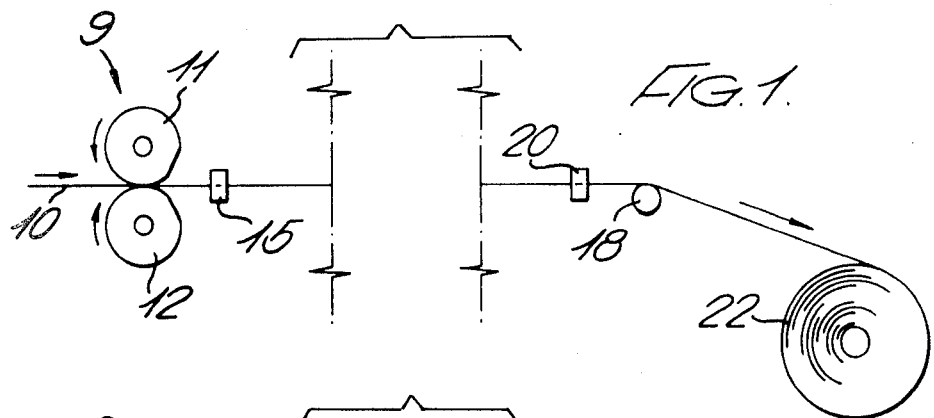
FIG. 1 is a diagrammatic side elevation of part of a production line in which a metal strip is being trimmed and wound on to a tension reel.
Figure 2:
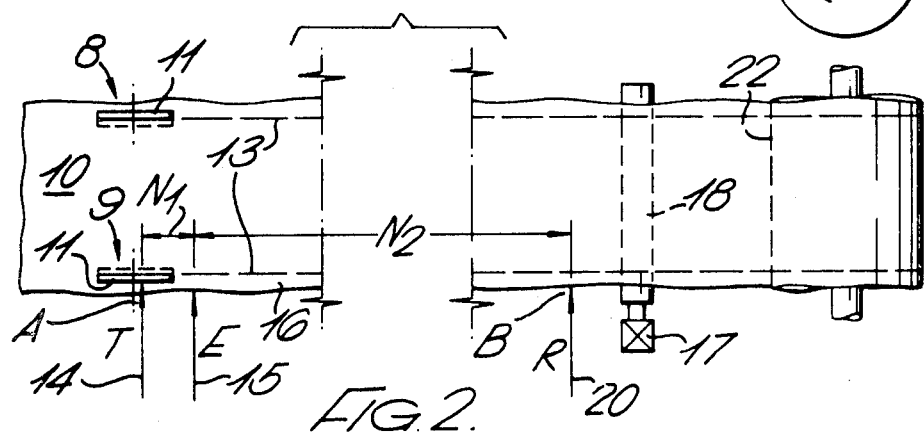
FIG. 2 is a plan of the same apparatus.
Figure 3:
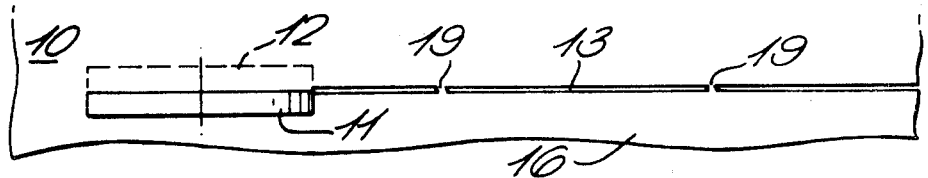
FIG. 3 is an enlarged portion of the edge of the metal strip showing the partially severed scrap portion.

In FIGS. 1 and 2, a strip 10 is illustrated as moving from left to right and passes through two pairs of trimmer knives 8,9, one pair located towards each side of the strip. Each pair of trimmer knives 8,9 consists of top and bottom rotary knives 11 and 12 and the two pairs are used to cut straight edges 13 which are partially severed on each side of the strip 10. From FIG. 3 it will be seen that the top and bottom knives are laterally off-set. The gap between the top knife and the bottom knife is less than the thickness of the strip and for thin strip the blades may even overlap one another. The knives act in similar fashion to scissors to shear and cut the strip.

The circular part of the knives shear the strip but the circumference of the knives if relieved by means of machined "flats" and the strip is not severed because of the increased gap at these flats.

Figure 4:
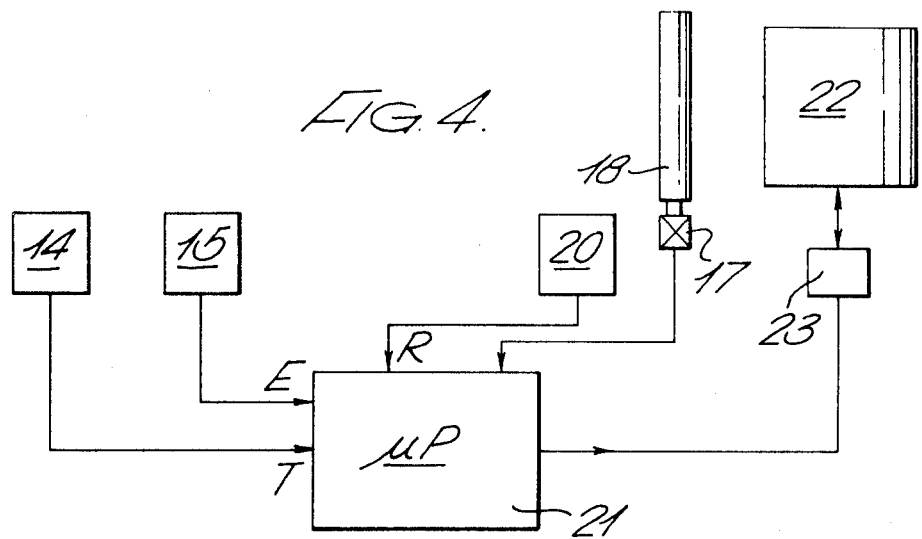
FIG. 4 is a block diagram which shows a measurement and control circuit including a microcomputer.

A position sensor 14 is used to sense the position T of the trimmer knife 11 at position A of the strip. An adjacent position sensor 15 is used to sense the position of the uncut edge E of the scrap portion 16. A digital tachometer 17 driven by a roll 18 in contact with the surface of the strip 10 produces a pulse output continuously, which is indicative of the length of strip travel between the position A and a position B at which a further measurement R is made indicating the position of the outer lateral edge of scrap portion 16. The number of pulses N2 recorded on the digital tachometer is an indication of the length of the strip which may be a considerable length e.g. 100 meters or more. As will be seen in FIG. 3 the edge portion 16 remains attached to the strip 10 by spaced frangible interconnecting pieces 19 which may be produced by the methods described in U.K. Patent Specification No. 1566741. The edge position R is determined by a sensor 20, and all of the signals produced by the position sensors 14, 15 and 20 are fed to a microcomputer 21 as illustrated in FIG. 4, i.e. the signals T, E and R are fed to the microcomputer. The output of digital tachometer 17 is also provided to the microcomputer 21.

The microcomputer 21 determines and records the scrap width as (E-T) at the position A. As the strip approaches the reel 22, the sensor 20 indicates the position R of the scrap edge to the microcomputer which then determines the width of the scrap portion (E-T) by reference to the signals from the digital tachometer 17 and the recorded scrap width (E-T) and then determines the position of the straight (trimmed) edge as R-(E-T). The microcomputer produces a signal corresponding to the determined function, which is fed to an actuator 23 by which the lateral position of reel 22 is controlled. Thus the reel is aligned so as to produce a continuously wound strip with the trimmed or cut edges in alignment.

The strip edge position E and the knife position T are measured at points as close together as possible to avoid errors. In practice because the trimmer moves only a small amount any error is insignificant providing the edge position E and knife position T are within a few centimeters of each other. Even if the sensors 14 and 15 are not close together any error can be corrected by combining the signal E with a signal T delayed by a number N1 pulses of the tachometer.

If the strip shown in the drawings has just come through a pickling bath, then after coiling on to the reel 22 the coil will be removed from the pickle line and transported to its next stage of processing which may for example be a cold rolling mill. At some appropriate position on the conveyors between the pickle line and the cold mill there may be a station provided where the edge scrap is removed from the coil.

Figure 5A:
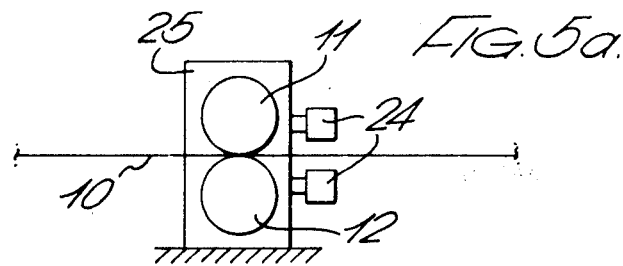
FIG. 5a is an elevation of a modified form of the invention.
Figure 5B:
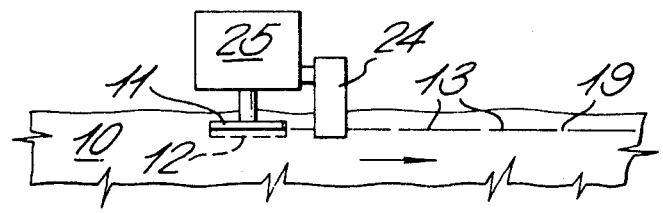
FIG. 5b is a plan view of the same.

In the modification shown in FIG. 5 a single edge sensors 24 may be mounted on the trimmer head 25 itself. The advantage of this arrangement is that the edge sensor 24 moves with the trimmer head 25. The edge sensor will detect the edge of the strip and in effect it detects the position of the strip in relation to the trimmer itself and hence in relation to the cut made by the knife. In effect, this one sensor measures the scrap width (E-T) directly. This system thus requires only one sensor instead of two sensors as previously required.

What is claimed is:

1. A method of winding strip material on to a coil or mandrel, in which the strip has at least one scrap edge portion partially severed by a trimming knife along a straight line in such a way that the scrap portion is frangibly attached to the strip, comprising:

producing a continuous record of the width of the scrap portion at a first strip position at the knife;

determining the lateral position of the outer edge of the scrap portion as the strip is about to be wound on to the coil or mandrel at a second strip position;

determining the appropriate measured width of the scrap portion at the second strip position by reference to the record of scrap portion width and the length of strip between the first and second strip positions;

determining the actual position of the cut straight edge of the strip at the second strip position by calculating the difference between the lateral position of the outer edge of the scrap portion and the scrap width; and controlling the axial position of the coil or mandrel so that the strip will be wound to produce a coil with the cut edge of the strip in alignment.

2. A method as claimed in claim 1 wherein the width of the scrap portion is found by taking a continuous series of measurements of the lateral position of the trimming knife or the straight edge of the strip, at or adjacent to the first strip position at the knife; taking a corresponding series of measurements of the lateral position of the adjacent outer edge of the scrap portion and producing a record of the difference between the outer edge lateral position and the trimming knife lateral position.

3. A method as claimed in claim 2 wherein the measured lateral position of the trimming knife or the straight edge of the strip and the measured lateral position of the adjacent outer edge of the scrap portion are supplied as data to a computer which determines and records the width of the scrap portion.

4. A method as claimed in claim 3 wherein the determined lateral position of the outer edge of the scrap portion at the second strip position; and information indicative of the length of strip between the first and second strip positions are supplied as data to the computer which calculates the length of the strip between the first and second strip positions and determines the appropriate of the recorded scrap portion widths, and then determines the actual position comprising the determined lateral position of the outer edge of the scrap portion minus the width of the scrap portion, of the cut edge of the strip.

5. A method as claimed in claim 1 wherein the scrap width is determined by taking a continuous series of measurements of the position of the edge of the strip relative to the trimming knife at or adjacent thereto.

6. A method as claimed in claim 5 wherein the measured relative position or scrap width is continuously supplied as data to a microcomputer which records the data, and then uses the recorded data in conjunction with the calculated or measured length of strip between the first and second strip positions to determine the appropriate scrap portion width to be used with the lateral edge position.

7. A method as claimed in claim 4 wherein the computer produces a control signal to operate an actuator which moves the coil or mandrel laterally so that cut edge is aligned.

8. A method as claimed in claim 6 wherein the computer produces a control signal to operate an actuator which moves the coil or mandrel laterally so that cut edge is aligned.

9. A method as claimed in claim 1, wherein the amount of strip travel between the first and second strip positions is determined by using a digital tachometer driven by a roll over which the strip passes.

10. An apparatus for winding strip material on to a coil or mandrel, the strip material having at least one scrap edge portion partially severed by a trimming knife along a straight line in such a way that the scrap portion is frangibly attached to the strip, comprising:

means for producing a continuous record of the width of the scrap portion at a first strip position at the knife;

a sensor for sensing the lateral position of the outer edge of the scrap portion as the strip is about to be wound on to the coil or mandrel at a second strip position B;

means for determining the appropriate measured width of the scrap portion at position B by reference to the record of scrap portion width and the length of strip between the first and second strip positions;

means for determining the actual position of the cut straight edge of the strip at the second strip position from the sensed lateral position and the appropriate scrap width; and control means responsive to the position determining means, for controlling the axial position of the coil or mandrel so that the strip will be wound to produce a coil with the cut edge of the strip in alignment.

11. An apparatus as claimed in claim 10 wherein the record producing means includes a sensor for sensing the lateral position of the trimming knife, and a sensor for sensing the lateral position of the uncut scrap edge, and also includes means for determining and recording the difference between the sensed positions lateral position of the uncut scrap edge and the lateral position of the trimming knife.

12. An apparatus as claimed in claim 10 wherein the record producing means includes a sensor mounted with the trimming knife for sensing the position of uncut scrap edge relative to the knife, and thus the scrap width.

13. An apparatus as claimed in claim 10, wherein a computer records the scrap width at the first strip position, determines the actual position of the cut edge at second strip position, and supplies a control signal to the control means so as to align the strip as the strip is wound.

14. An apparatus as claimed in claim 10 wherein a digital tachometer connected to a roll over which the strip passes, is used to determine the amount of strip travel between the first and second strip positions.

* * * * *